United States Patent [19]

Lainer et al.

[11] 4,024,087
[45] May 17, 1977

[54] METHOD OF PREPARING COAGULANT FOR PURIFICATION OF WATER FROM MECHANICAL ADMIXTURES

[76] Inventors: Jury Abramovich Lainer, prospekt Vernadskogo, 113 kv. 183, Moscow; Eldar Ismail Ogly Tagiev, 22 Nagornaya ulitsa, 13, blok 2, kv. 27, Baku; Gakif Zakirovich Nasyrov, prospekt Nauki, 12, kv. 49, Leningrad; Valentina Ivanovna Zakharova, Khoroshevskoe shosse, 1, kv. 60, Moscow, all of U.S.S.R.; Abram Ilich Lainer, deceased, late of Moscow, U.S.S.R.; Vera Nikolaevna Lainer, administrator, Volokolamskoe shosse, 6, kv. 131, Moscow, U.S.S.R.; Jury Abramovich Lainer, administrator, prospekt Vernadskogo, 113, kv. 183, Moscow, U.S.S.R.; Nina Abramovna Gelfand, administrator, 9 Parkovaya ulitsa, 47, korpus 2, kv. 46, Moscow, U.S.S.R.

[22] Filed: Nov. 6, 1975

[21] Appl. No.: 629,703

[52] U.S. Cl. .................................. 252/179; 210/47; 252/175; 423/518; 423/556

[51] Int. Cl.$^2$ .......................................... C02B 5/02
[58] Field of Search .................... 210/47; 252/179; 423/518, 556; 252/175

[56] References Cited

UNITED STATES PATENTS

| 1,249,125 | 12/1917 | Langford | 423/556 |
| 1,457,787 | 6/1923 | Moldenke | 423/556 |
| 1,591,798 | 7/1926 | Tilley | 423/556 |

*Primary Examiner*—Mayer Weinblatt

[57] ABSTRACT

The method of preparing a coagulant for purification of water from mechanical admixtures consists in that alunite is roasted at a temperature of 520°–620° C. The roasted alunite is leached with a 20–35 per cent aqueous solution of sulphuric acid taken in the quantity of 70–90 per cent of the stoichiometrically required quantity, at a temperature of 80°–100° C. After leaching, roasted alunite is added in the quantity of 10–15 per cent of the weight of the starting alunite. The resultant pulp consists of solid and liquid phases, the liquid phase being an aqueous solution of the end product, while the solid phase is an insoluble residue. The solution is separated from the insoluble residue and the end product is finally isolated from the solution.

6 Claims, No Drawings

METHOD OF PREPARING COAGULANT FOR PURIFICATION OF WATER FROM MECHANICAL ADMIXTURES

This invention relates to the manufacture of mineral salts and more particularly to a method of preparing a coagulant for purification of water from mechanical admixtures.

Said coagulant is a mixture of sulphates, of which aluminum sulphate is the coagulating agent. The coagulant can be used to purify potable water, water for process needs, and also for treatment of sewage.

Known widely in the prior art are methods for preparing a coagulant in which aluminum hydroxide is used as the starting material.

According to this method, aluminum hydroxide is dissolved in sulphuric acid, the solution is mixed with live steam, and the temperature is maintained at 110°–120° C. The reaction mixture containing 13.5 – 15 percent of $Al_2O_3$ is cooled to 95° C, and the coagulant aluminum sulphate, is isolated.

The main disadvantage inherent in the known method is that aluminum hydroxide is an expensive material.

For this reason, much attention is given at the present time to nepheline concentrate, kaolin, clays, alunites, and high-silicon bauxites, these materials being more readily available. Alunites are the materials that seem to offer great advantage in the manufacture of coagulants. The presence in them of sulphuric anhydride decreases by about thirty percent the consumption of sulphuric acid (compared with the acid requirements in the method utilizing aluminum hydroxide). For example, there is known in the prior art a method for preparing a coagulant for purifying water from mechanical admixtures made out of alunite, prepared by a two step sulphation. The method consists in that alunite is crushed, mixed with part of a recycled solution of sulphuric acid taken in the quantity of 10–15 percent of the stOichiometrically required quantity, and the pulp is sintered in a 'boiling-bed' apparatus in two steps. In the first sintering step the temperature is 200°–250° C. The resultant product, granulated material, is roasted in the second step at a temperature of 560°–580° C. The roasted granules are leached with a 10–15 percent solution of sulphuric acid (90–85 percent of the stoichiometric quantity) at a temperature of 96°–103° C in the presence of washing water. The insoluble residue is then separated from the leached pulp by filtration, and the end product is finally isolated by evaporation and granulation in the 'boiling-bed' apparatus.

This method is complicated by the sulphation process which is effected in two steps. Moreover, thermal treatment of alunite in the presence of sulphuric acid involves considerable loss of sulphuric acid in the gaseous phase. The process is rather cumbersome too, since it comprises two units of the 'boiling-bed' type.

The quality of the product obtained by the above-described methods cannot be guaranteed with respect to the free sulphuric acid content, and the granulometric composition.

The object of the invention is to provide a method of preparing a coagulant for purification of water from mechanical admixtures, that would make it possible to improve the quality of the end product, to decrease the loss of sulphuric acid, and to simplify the process equipment and the flow-sheet.

In accordance with this and other objects, the invention consists in a method of preparing a coagulant for purification of water from mechanical admixtures, manufactured from alunite, in which according to the invention, alunite is roasted at a temperature of 520°–620° C, the roasted alunite is leached with a 20–35 percent aqueous solution of sulphuric acid taken in the quantity of 70–90 percent of the stoichiometrically required quantity, at a temperature of 80°–100° C, after which roasted alunite is added in the quantity of 10–15 percent of the weight of the starting alunite, as a result of which a pulp is prepared consistisng of solid and liquid phases, the liquid phase being an aqueous solution of the end product, while the solid phase is an insoluble residue which is separated from the solution and the end product is finally isolated from said solution.

The solution can be separated from the insoluble residue by settling out, centrifuging, or by filtration in vacuum or under pressure.

In order to accelerate the process of separation of the solution from the insoluble residue it is recommended to add flocculating agents to the pulp in the quantity of 10–40 g/cu.m. after which the pulp can be settled, centrifuged, or filtered in vacuum or under pressure.

Polyacrylamides should preferably be used as the flocculating agents.

Depending on the manner by which the end product is isolated from the solution, the obtained coagulant can be either in the form of alum or in the form of a mixture of the alum with aluminum sulphate.

If the end product is desired in the form of alum, the solution should be cooled to a temperature of 30°–50° C.

If however, the product is desired in the form of a mixture of the alum with aluminum sulphate, and also if the yield of the end product is desired to be increased, the solution should be evaporated to reduce its initial volume by 10–15 percent and only then cooled to a temperature of 30°–50° C.

In order to increase the aluminum oxide content of the coagulant, it is recommended to recover the end product from the solution by drying it with hot gas having an initial temperature from 500° to 600° C.

The proposed method of preparing the coagulant has the following advantages over the known ones.

In contrast to the coagulant produced by the known method, the coagulant prepared by the proposed method is guaranteed with respect to the content of free sulphuric acid. This is attained by effecting the leaching process at controlled consumption and concentration of sulphuric acid with addition of roasted alunite to neutralize free sulphuric acid. The processing with sulphuric acid at a temperature of 80°–100° C rules out otherwise high loss of sulphuric acid.

The proposed method can be arranged as a part of the complex processing of alunite into alumina, sulphuric acid, and potassium fertilizers, in which sulphuric acid is used for preparing the coagulant. The requirements for the concentration of sulphuric acid and the presence of admixtures in it can be lessened. For example, 65 percent (and even less concentrated) sulphuric acid can be used for the purpose.

Said method provides for the manufacture of a neutral coagulant that can be used for purification of both potable water, and industrial effluents and sewage.

The method of preparing a coagulant for purification of water from mechanical admixtures consists in the following.

Alunite ore is crushed, ground, and roasted at a temperature of 520°–620° C in a rotary kiln or in a 'boiling-bed' kiln. Roasted alunite is leached in reactors provided with stirrers at a temperature of 80°–100° C for 1–2 hours. Then alunite is mixed with a 20–35 percent aqueous solution of sulphuric acid taken in the quantity of 70–90 percent of the stoichiometrically required amount, which is necessary to bind all aluminum oxide contained in the ore in aluminum sulphate.

If strong (92 percent) sulphuric acid is used for leaching alunite, an aqueous pulp of roasted alunite is first prepared. The content of the solid phase is adjusted to the required level, and then strong sulphuric acid is added in the quantity required to prepare a 20–35 percent solution. In order to neutralize free sulphuric acid, roasted alunite is added in the quantity of 10–15 percent of the weight of the initial alunite, into the obtained pulp, 10–20 minutes before the leaching process is over.

After leaching is over, the solution is separated from the insoluble residue by any known – settling, filtering, centrifuging, etc. In order to accelerate the separation process, flocculating agents, for example, water-soluble polymers, polyacrylamides, can be added to the pulp in the quantity of 10–40 g/cu.m. The separation process can thus be accelerated 2–5 times.

After separation of the solution from the soluble residue, the end product is recovered from the solution. The insoluble residue is washed with hot water and utilized in the manufacture of ceramics. Washing waters should preferably be utilized in preparing the pulp, i.e. reused in the process.

The end product, the coagulant, is recovered from the solution either by crystallization or by drying.

In order to isolate the end product by crystallization, the solution is cooled from 80°–100° C to 30°–50° C, as a result of which alum is precipitated as the solid phase.

Before cooling the solution, it can be evaporated to reduce the volume of the liquid by 10–15 percent of the initial. The coagulant is thus isolated in the form of a mixture of the alum with aluminum sulphate.

The coagulant is separated from the mother liquor by any suitable method, for example, by centrifuging.

In order to increase the content of aluminum oxide in the finished product, the coagulant should be isolated by drying with hot gas, for example, with flue gas, having an initial temperature from 500° to 600° C.

The solution can also be dried in spray driers, in the 'boiling-bed' apparatus, etc.

The resultant coagulant contains aluminum oxide in quantities 18.5 – 19.5 percent higher than usual.

The process equipment for realization of the proposed method is simplified, since alunite is roasted in a single apparatus (in contrast to the known method, where two 'boiling-bed' units for sintering alunite with sulphuric acid are used). The roasted alunite is processed with sulphuric acid at a temperature at which sulphuric acid does not decompose, and for this reason no special apparatus for recovery of sulphuric acid is required.

For a better understanding of the invention, the following examples of its practical embodiment are given by way of illustration.

EXAMPLE 1

Alunite used for preparing the coagulant has the following composition in percent by weight
$Al_2O_3$; 21.7
$SiO_2$; 43.0
$SO_3$; 20.0
$K_2O$; 4.5
$Na_2O$; 2.0
$Fe_2O_3$; 4.5
$V_2O_5$; 0.05
balance; 4.3

Alunite is crushed to prepare granules sizing 1 – 3 mm. The granules are roasted at a temperature of 520°–540° C in a rotary kiln, then cooled to a temperature of 90° C and mixed with recycled solution (washings) to prepare pulp containing solids 300–350 g/liter. Now sulphuric acid having a concentration of 20 percent is added in the quantity of 90 percent of the stoichiometrically required amount which is necessary to bind all aluminum oxide in aluminum sulphate, and then a 92 percent solution of sulphuric acid is added. The leaching process is carried out at a temperature of 95° C for 1 hour. Ten minutes before the termination of the leaching process, roasted alunite is added in the quantity of 10 percent of the initial weight of alunite. Dry granulated (carbonate) polyacrylamide is now added to the pulp in the quantity of 20 g/cu.m. as a flocculating agent. The pulp is passed through a filter working under a pressure of 6 atm, and the solution containing the end product is separated from an insoluble residue. The residue is washed with hot water, dried on a filter, and collected in a receptacle. The washing waters are reused in preparing the pulp.

The solution has the following composition, in grams per liter
$Al_2O_3$, 108; $Fe_2O_3$, 5.0; insoluble residue, 0.8; $Na_2O$, 2.8; $K_2O$, 6.2.

The solution is dried with flue gases having an inlet temperature of 500°–600° C and a outlet temperature of 90°–100° C.

The obtained coagulant has the following composition, % w/w: $Al_2O_3$ 18.5–19.5; $H_2SO_4$ 0 – 0.005; insoluble residue 0.8, $Fe_2O_3$ 0.7 The grading of the product is as this:
fraction, mm; +4; −4+3; −3+2; −2+1; −1.
content, %; 0.4−1; 3−7; 42−48; 40−47; 3−7.

EXAMPLE 2

Alunite having the same composition as specified in Example 1 is crushed to obtain granules sizing 1–3 mm and roasted at a temperature of 600°–620° C in a rotary kiln. The granules are cooled and a roasted alunite is leached with a 35 percent solution of sulphuric acid taken in the quantity of 70 percent of the stoichiometrically required amount, which is necessary to bind all aluminum oxide in aluminium sulphate. The leaching process is carried out at a temperature of 80° C for one hour. Ten minutes before the end of the leaching process, roasted alunite is added to the pulp in the quantity of 15 percent of the initial weight of alunite. The solution is then separated from the insoluble residue by centrifuging at 1200 r. p.m. (solids content of filtrate is 0.5 g/liter). The solution is passed into a crystallization tank where it is cooled to 40° C to precipitate the coagulant in the form of potassium alum.

The alum is separated from the mother liquor by centrifuging.

The obtained coagulant has the following composition, in % (w/w) $Al_2O_3$ 13.5; $Fe_2O_3$ 0.8; $H_2SO_4$ (free) nil; insoluble residue, nil.

EXAMPLE 3

Alunite of the same composition as specified in Example 1 is roasted in a rotary kiln at a temperature of 580°– 600° C. The roasted alunite is leached with a 25 percent solution of sulphuric acid taken in the quantity of 80 percent of the stoichiometrically required quantity. The leaching process is effected at a temperature of 100° C for one hour. Ten minutes before the termination of the leaching process, roasted alunite is added in the quantity of 10 percent of the initial weight of alunite. Now a flocculating agent (dry granulated, carbonate-form polyacrylamide) is added in the quantity of 25 g/cu.m. The pulp is then filtered in vacuum (500–600 mm Hg) at a rate of 300 – 400 kg/sq.m. per hour.

The composition of the obtained coagulant is as in Example 1.

EXAMPLE 4

Alunite has the following composition, in percent by weight: $Al_2O_3$ 18.8; $SiO_2$ 50.6, $SO_3$ 18.6, $K_2O$ 4.0, $Na_2O$ 0.6, $Fe_2O_3$ 1.5 $V_2O_5$ 0.05, the balance 5.9.

Alunite is processed as described in Example 1, except that the insoluble residue is separated from the solution with addition of dry, granulated, sulphate-form polyacrylamide as the flocculating agent which is added in the quantity of 30 g/cu.m.

The obtained coagulant has the composition as specified in Example 1.

EXAMPLE 5

The coagulant is prepared by a procedure similar to that described in Example 1. The composition of the coagulant is also the same as in Example 1.

The coagulant is isolated from the solution as follows. First the solution is evaporated to reduce the initial volume by 10 percent and then cooled to 40° C. The isolated coagulant is separated from the mother liquor by centrifuging at 1200 r. p.m. (the solids content of the filtrate is 0.5 g/liter).

What is claimed is:

1. A method of preparing a coagulant from alunite for purification of water from mechanical admixtures comprising the steps of roasting alunite at a temperature of 520°–620° C.; leaching the roasted alunite at a temperature of 80°–100° C. with a 20–35 percent solution of sulphuric acid in an amount of 70–90 per cent of the stoichiometrically required amount; adding roasted alunite to the leached alunite in an amount of 10–15 percent of the weight of the starting alunite to form a pulp consisting of solid and liquid phases, the liquid phase being an aqueous solution of the end product and the solid phase being an insoluble residue; separating said solution from said insoluble residue; and isolating the end product from said solution.

2. The method of claim 1, in which the end product is isolated from the solution by drying it with hot gas having an initial temperature of 500°–600° C.

3. The method of claim 1, in which the solution is separated from the insoluble residue with addition of a flocculating agent in the quantity of 10–40 g/cu.m.

4. The method of claim 3, in which a polyacrylomide is used as the flocculating agent.

5. The method of claim 1, in which the end product is isolated from the solution by cooling the solution to a temperature of 30°–50° C.

6. The method of claim 5, in which before cooling to a temperature of 30°–50° C, the solution is evaporated to reduce its initial volume by 10–15 percent.

* * * * *